July 28, 1959 W. H. BLASHFIELD 2,897,278

AUTOMATIC TELEPHONE SYSTEM

Filed Nov. 16, 1954 7 Sheets-Sheet 1

INVENTOR.
WILLIAM H. BLASHFIELD

BY
Brown, Jackson, Boettcher & Dienner

ATTYS.

July 28, 1959 W. H. BLASHFIELD 2,897,278

AUTOMATIC TELEPHONE SYSTEM

Filed Nov. 16, 1954 7 Sheets-Sheet 2

INVENTOR.
WILLIAM H. BLASHFIELD

BY

Brown, Jackson, Boettcher & Dienner

ATTYS.

*INVENTOR.*

WILLIAM H. BLASHFIELD

*BY*

Brown, Jackson, Boettcher & Dienner

ATTYS.

July 28, 1959 W. H. BLASHFIELD 2,897,278

AUTOMATIC TELEPHONE SYSTEM

Filed Nov. 16, 1954 7 Sheets-Sheet 4

*INVENTOR.*
WILLIAM H. BLASHFIELD

*BY*

Brown, Jackson, Boettcher & Dienner

ATTYS.

INVENTOR.
WILLIAM H. BLASHFIELD

BY

Brown, Jackson, Boettcher & Dienner

ATTYS.

INVENTOR.
WILLIAM H. BLASHFIELD
BY
Brown, Jackson, Boettcher & Dienner
ATTYS.

July 28, 1959 W. H. BLASHFIELD 2,897,278

AUTOMATIC TELEPHONE SYSTEM

Filed Nov. 16, 1954 7 Sheets-Sheet 7

INVENTOR.
WILLIAM H. BLASHFIELD

BY

Brown, Jackson, Boettcher & Dienner

ATTYS.

2,897,278

AUTOMATIC TELEPHONE SYSTEM

William H. Blashfield, Galion, Ohio, assignor to North Electric Company, a corporation of Ohio Application November 16, 1954, Serial No. 469,187

20 Claims. (Cl. 179—18)

The present invention relates in general to an automatic telephone system, and in particular, to a novel telephone system which includes toll ticketing equipment therein.

In most arrangements toll ticketing equipment functions to record the number of the calling subscriber, the number of the called subscriber, the date, the initial time of the call, the total elapsed time of the call and the identity of the calling and called subscriber exchanges. The use of automatic toll ticketing equipment to record the pertinent data of a telephone call for billing purposes in this manner has proven to be extremely successful, not only in reducing the cost of the telephone service for subscribers, but also in contributing greatly to improved service.

The advantages of such equipment are immediately apparent. However, the use thereof in certain types of exchanges, as for example in those installations where short-haul low-density traffic is prevalent, the high initial cost of most known types of automatic toll ticketing operation has restricted somewhat the more general application thereof.

In Patent Nos. 2,782,257 and 2,800,532 which issued to W. H. Blashfield et al. on February 19, 1957, and July 23, 1957, respectively; and in a copending application having Serial No. 368,066, which was filed on July 15, 1953, by Blashfield et al., each of which has been assigned to the present assignee, there are set forth automatic toll ticketing systems which have greatly reduced the initial cost of installations and have made possible, from a practical standpoint, the use of toll ticketing equipment in an increased number of exchanges.

In the achievement of this more inexpensive form of toll ticketing equipment, the calling party identifies his line by dialing his assigned directory during the initiation of a call. Such identification arrangement introduces the possibility of human error and it is necessary, therefore, in such equipment to provide an arrangement for checking the accuracy of the number as dialed by the calling party. If the arrangement ascertains that the calling party has dialed his assigned directory number accurately, the call is allowed to proceed. In the event that the calling party has not identified his line accurately, the call is blocked and a further attempt to extend a new connection must be made by the subscriber. In this manner, the equipment provides an accurate record of the calls made by the subscribers of an exchange, and insures assignment of the charge to the subscriber initiating the call.

The obvious advantages of the "dial-your-own-number" type equipment have resulted in the provision of various types of checking equipment, one form of which comprises extension of a connection back to the calling line for the purpose of identifying the calling line. One of the more successful checking arrangements of this type utilizes recorders, accessed over a first selector level, to seize an associated register-sender-selector. As the calling party dials the thousands digit of the calling number, the register-sender-selector equipment operates its associated check selector switch to select the thousands group in which the calling party is to be found. Dialing of the hundreds digit of the calling number causes the check selector to select the one hundred line group containing the calling line by seizing one of two idle check connectors associated with this hundred line group and marking it via a lead PA, PB, or PC as to the particular hundreds group required. Each of the check connectors has access to the P-wires of three hundred subscriber lines, the PA, PB or PC marking indicating the field of one hundred P-wires which is pertinent to the call. Dialing of the tens and units digits of the calling number then causes the seized check connector to make connection with the calling P-wire for a line verification test. The call extending units in the test equipment are operated to extend or block the call in accordance with the nature of the test results obtained. As is apparent from the foregoing disclosure, this system, while extremely successful in operation, requires at least one and preferably two check connectors for each three hundred subscriber lines.

One object of the present invention is to provide a novel and improved identification and checking system of a more economical type for use with exchanges wherein the calling subscriber dials his own telephone number.

The present invention has as a specific object thereof the provision of a novel switching arrangement in which a single test connector multiple capable of reaching all lines in the exchange is used in lieu of the usual two check connectors per three hundred line group.

A feature of the arrangement is the manner in which such multiple is utilized by the register only long enough to apply a tone check. In this manner the connector control relays are eliminated in favor of a relatively small number of registers, and the cost and space of check links is approximately halved.

Other features and advantages of the novel check register and check connector and further features of the invention will become apparent from the following drawings, claims and specifications, in which:

GENERAL OPERATION

Figures 1A, 7:
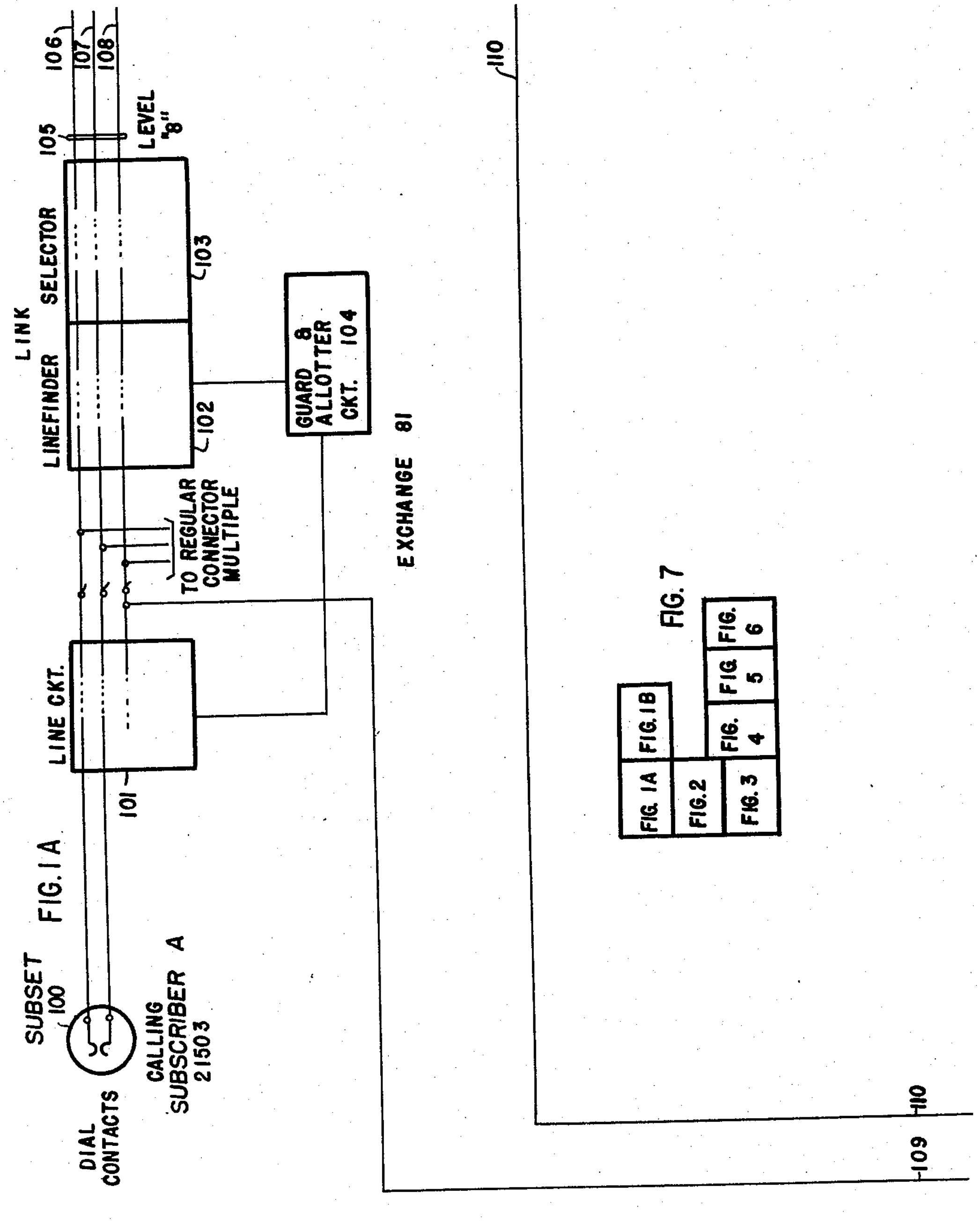
Figures 1A and 1B are schematic diagrams, partly in block form, illustrating the automatic toll ticketing system of the present invention with the exception of the check register and check connector components thereof.
Figure 7 is a block diagram illustrating the manner in which the equipment illustrated in Figures 1A–6 is connected together.
Figure 1B:
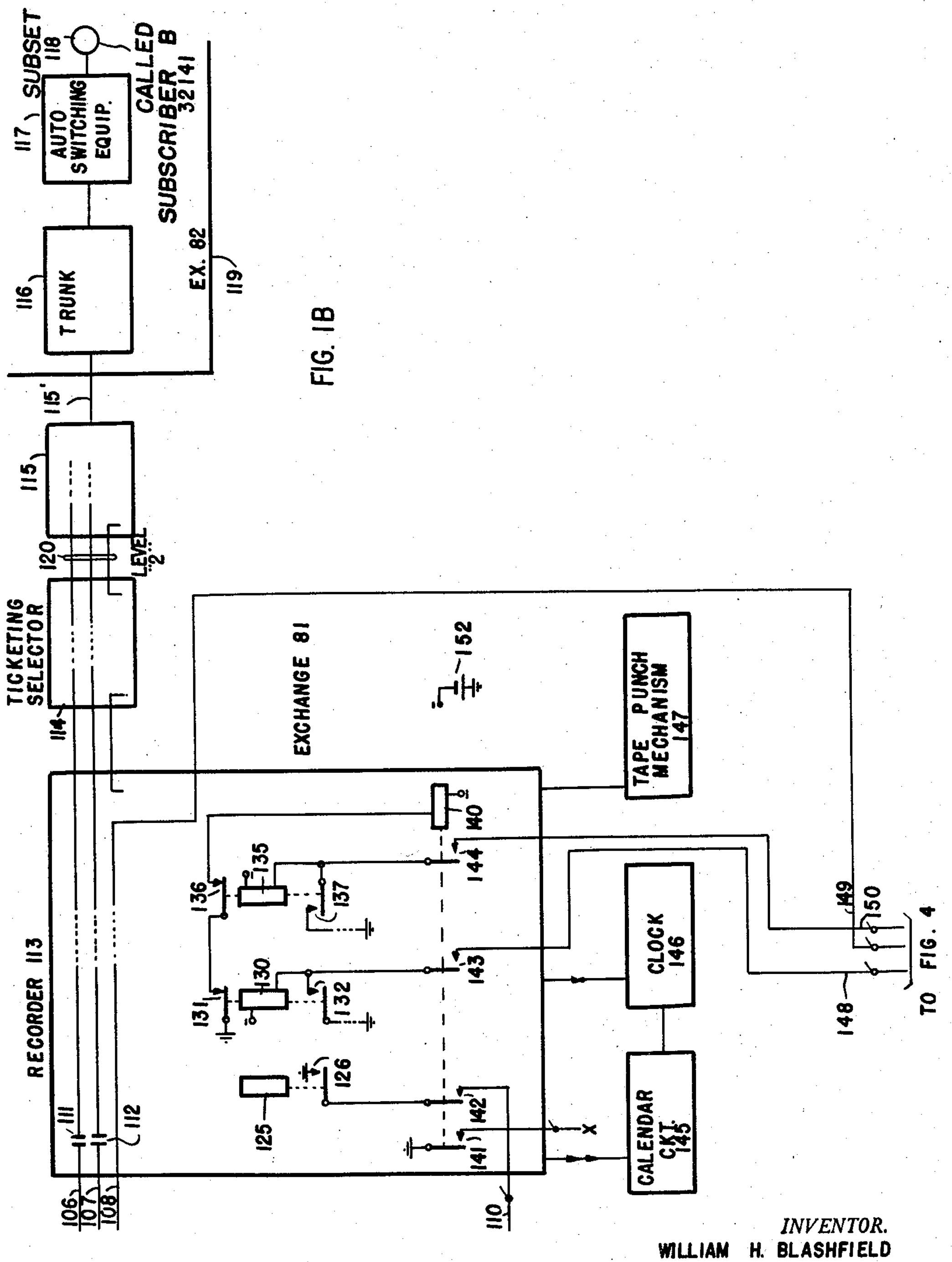

In explaining the arrangement and operation of an illustrative embodiment of the present invention reference is made to Figures 1A–6 which illustrate the structure by which a connection may be extended from the subset of the calling subscriber "A," who is assumed to have been assigned directory Number 21503 in Exchange 81 for illustrative purposes, to a called subscriber "B" in Exchange 82, who is assumed to have been assigned directory Number 32141. With the exception of the recorder, the novel check register and the check connector circuits, the station and central office equipment is conventional and operates in the manner well known to those skilled in the telephone art.

When the calling subscriber "A" lifts his receiver from subset 100 (Figure 1A), an associated line circuit 101 is energized under the control of conventional guard and allotter circuits 104 and seizes one of an associated group of line finder-selector links 102 and 103. Dial tone is returned to the subscriber by the seized link in the conventional manner and the calling subscriber thereupon dials the called office code, his own directory number and the directory number of the called party.

| Exchange Code | Calling Number | Called Number |
|---|---|---|
| 82 | 21503 | 32141 |

Upon the dialing of digit "8," the selector 103 advances to the eighth level which has access to a group of recorders (Figure 1B) such as 113. Conventional automatic trunk selection equipment operates with advancement of the selector to the eighth level to seize an idle one of the recorders of a group which is accessible to such level.

Each recorder in the group which is available to the selector 103 is tied back to back with an associated ticketing selector 114 and its own tape punch mechanism 147. As the calling subscriber now dials the digit "2," the ticketing selector 114 advances to the second level, to select an idle group of trunks, such as 115, which are interconnected with Exchange 82 by trunk lines, such as illustrated trunk line 115'.

Figure 2:
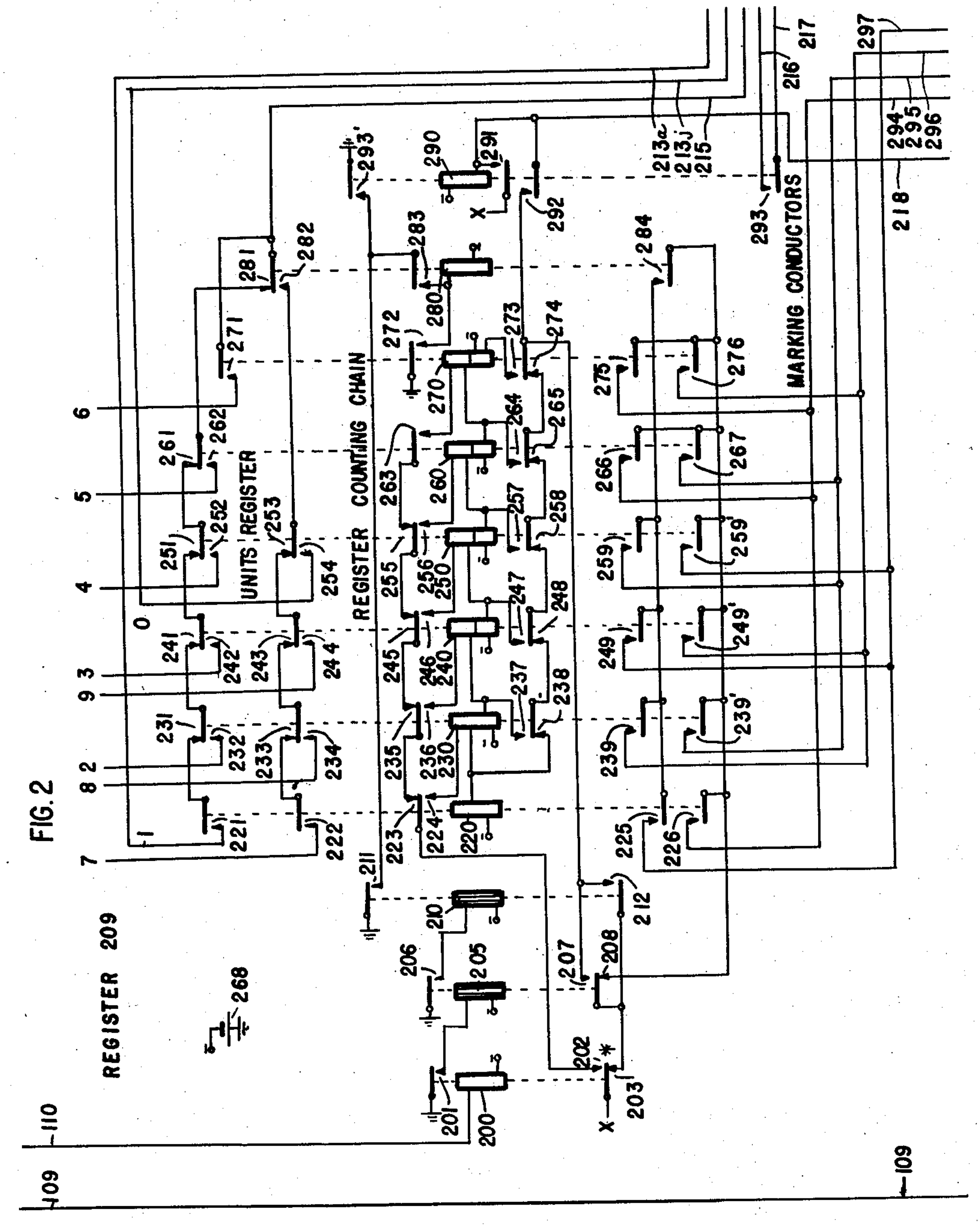
Figures 2, 3 and 4 are schematic representations of the improved check register of the present invention.
Figure 3:
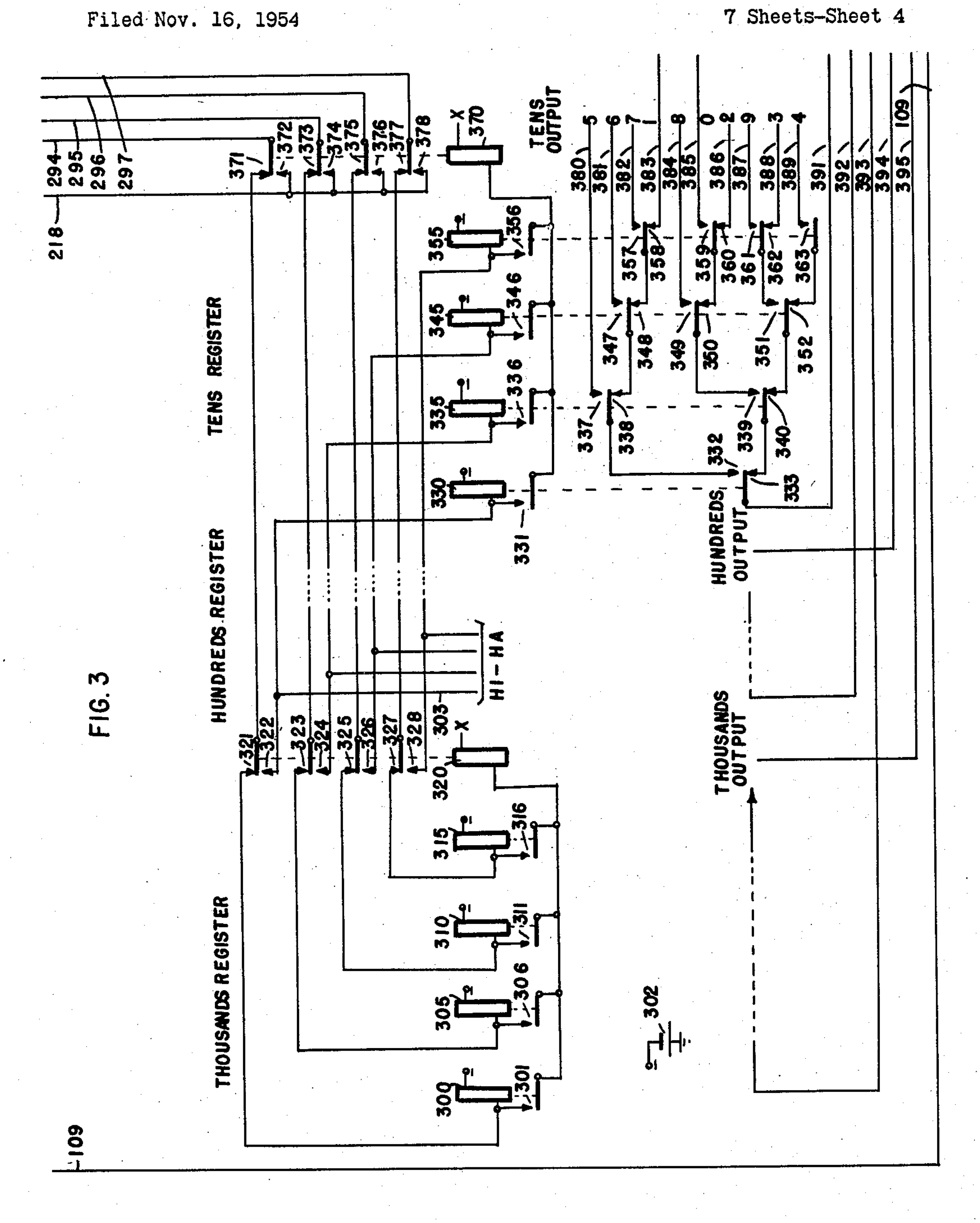
Figure 4:
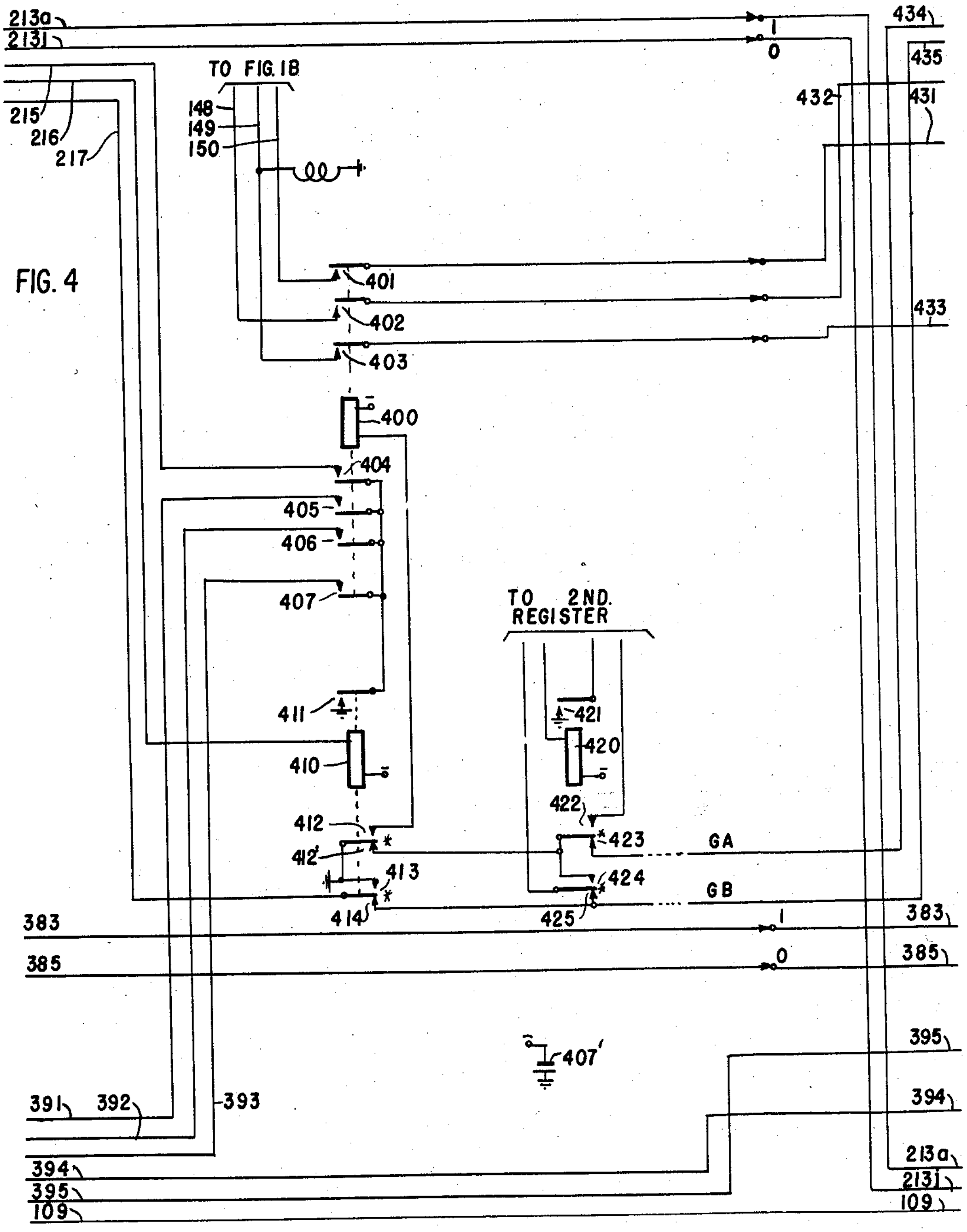

With the complete receipt of incoming digit "2," the digit following relay (not shown—"F" relay of a conventional switch) in recorder 113 restores, and recorder relay 140 is operated thereby over a conventional circuit (not shown) to connect the conductors 110, 148, 150, and the conductor designated by X, of an idle register, such as the register illustrated in Figures 2, 3 and 4, into the recorder 113.

The register 209 (Figure 2) accumulates and holds the digits corresponding to the calling number dialed by the calling subscriber until the first four digits have been dialed. The fifth digit is a ringing code digit ("3" in the present example) and has no effect upon the operation of the checking function of the present invention. After the dialing of the fourth digit by the calling subscriber, relays in the seized check register operate to seize the check connector 228 illustrated in Figures 5 and 6.

The check connector 228 comprises an oscillator 509 and groups of relays which are operated under the control of the seizing register to select the P-wire of the line circuit associated with the calling subscriber's subset and connect it to the oscillator circuit. Simultaneously the P-wire of the calling subscriber's line circuit is connected through the recorder to another portion of the oscillator of the check connector circuit.

If the calling subscriber has correctly dialed his own number, then the oscillator in the check connector is operated, resulting in the operation of a relay in the recorder 113 which permits extension of the talking circuit from subset 100 of calling subscriber "A" to subset 118 of called subscriber "B," by the calling subscriber. In the present example, if the calling subscriber has correctly dialed his own directory number, the dialing of the called party number will cause a connection to be extended from the subset of the calling subscriber "A" over the line circuit 101, links 102, 103, the recorder 113, the trunk switching train comprising ticketing selector 114, trunk circuit 115, the trunk line 115' connecting the two Exchanges 81 and 82, trunk circuit 116 and the automatic switching equipment in Exchange 82 to the subset of the called party whose directory number was assumed to be 32141.

As the desired exchange, the calling number and the called number are dialed in the extension of the connection, tape punch mechanism 147 operates to record these digits in the form of punches and interposed spaces on a tape (not shown) associated with recorder 113.

When the called party answers, the recorder seizes the common calendar circuit 145 and clock circuit 146 which, via the recorder, deliver information as to the date and time of day in the form of pulses to the tape punch mechanism 147, which in turn records this information on the paper tape in the form of a line of punches and interposed spaces. After this recording has been accomplished, the recorder releases calendar circuit 145. During conversation, the clock 146 delivers pulses every quarter minute to the recorder which counts the pulses, and delivers minute pulses to the tape punch mechanism, which in turn places minute pulses on the tape in the form of a line of punches.

If on the other hand, the test indicates that the calling party has not properly dialed his assigned number, the check connector blocks extension of the call beyond the recorder 113, and a new attempt must be made by the calling subscriber.

The calling party has complete control over the connection. When the call is completed, and the calling party replaces his receiver, line finder 102 and selector link 103 are released. In addition, recorder 113, line circuit 101, ticketing selector 114, trunks 115 and 116, as well as the automatic equipment in Exchange 82 are also released. All the equipment is then returned to an idle condition and is prepared for the receipt of another call.

DETAILED OPERATION

A more detailed description of the operation of the automatic toll ticketing arrangement of the present invention is set forth hereat. The calling subscriber lifts his handset to effect seizure of the line circuit 101, and line finder and selector links 102 and 103 in the conventional manner are held open by recorder 113, so that the dialing impulses corresponding to the calling directory number are not transmitted to ticketing selector 114. As previously noted, calling subscriber "A" in extending a call to a subscriber in Exchange B dials the code 82. With the dialing of digit "8," the seized link 102, 103 effects seizure of a recorder 113 and associated selector 114. As the second digit is received, the selector 114 advances to the second level to select an idle one of a group of trunks accessible thereto.

After the dialing of digit "2," seizure relay 140 of recorder 113 operates and effects seizure of an idle one of the recorders which are accessible thereto, as for example, register 209 and conductors 110, 148, and 150 from the seized ones of the registers into the recorder 113. Relay 140 at its contacts 141 also connects a common ground over conductor 151 to the seized one of the check register circuits.

REGISTRATION OF THOUSANDS DIGIT

As the calling party now dials the first digit of his directory number, the recorder pulsing relay 125 is operated in the manner set forth in the aforementioned copending application having Serial No. 669,175. Briefly, recorder relay 125 is operated with receipt of the break period of the first pulse and at its contacts 126 completes an operating circuit for register line relay 200, the circuit extending from negative battery over the winding of line relay 200, conductor 110, contacts 142 and 126 to ground.

Line relay 200 operates and at its contacts 201 completes an operating circuit for hold relay 205 (a slow release relay) and at its contacts 202 prepares a locking circuit for counting chain relays 220—270.

Hold relay 205 operates and at its contacts 206 completes an energizing circuit for the winding of relay 210 (a slow release relay which has a greater delay time than that of relay 205) and at its contacts 207 further prepares the counting chain locking circuit. Relay 210 operates and at its contacts 211 and 212 prepares a recycling circuit for the counting chain and a further point in the chain holding circuit.

When at the end of the open period of the first pulse recorder pulsing relay 125 releases, it is effective at its contacts 126 to effect restoration of the register line relay 200, which releases and at its contact 201 interrupts the energizing circuit for hold relay 205 which holds by reason of its slow to release characteristics, and at its contacts 203 completes an operating circuit for the first counting chain relay 220 which extends from negative battery over the winding of counting chain relay 220, contacts 238, 248, 258, 265, 274, 207 and 203 to ground.

Counting chain relay 220 operates and at its contacts 224 prepares a circuit to the upper winding of the second chain relay 230, and at its lower contacts 225 and 226 prepares a circuit for the thousands register relays 300—315 and the thousands transfer relay 320.

With the occurrence of the open period of the second pulse, relay 125 reoperates and at its contacts 126 recompletes the energizing circuit for register relay 200. Relay 200 operates and at its contacts 201 recompletes the energizing circuit for relay 205, which has been held operated by reason of its slow to release characteristics. Relay 200 at its make-before-break contacts 202, 203 closes an energizing circuit for relay 230 which extends over its upper winding in series with the winding of relay 220 and interrupts the operating circuit of relay 220; the energizing circuit for relay 230 extends from battery over the upper winding of relay 230, contacts 224 and 202 to register ground. Relay 230 operates and prepares circuits through its lower contacts 239 and 239' to the thousands relays 300—315 and to thousands transfer relay 320.

As recorder relay 125 releases at the end of the open period of the second pulse, it is effective at its contacts 126 to effect restoration of register line relay 200, which restores and at its contacts 203 completes a holding circuit for the second counting chain relay 230, the circuit extending from battery over the lower winding of relay 230 and contacts 237, 248, 258, 265, 274, 207 and 203 to ground. Relay 200 at its contacts 202 now opens the series holding circuit for the first and second counting chain relays 220 and 230 and the first counting relay 220 releases.

In that the thousands digit dialed in the present example is "2," the register relay 200 receives no more pulses from pulsing relay 125, and after a short interval of time relay 205 restores and at its contacts 206, opens the operating circuit for relay 210, which holds for a period consistent with its slow to release characteristics and then restores.

Since relays 200 and 205 both release prior to the release of slow to release relay 210, an operating circuit is completed for the second thousands marking relay 305 which extends from negative battery over the winding of relay 305, contacts 323, 373, C295 and contacts 239', 208 and 203 to ground.

Relay 305 operates and at its lower contact 306 prepares an operating circuit for relay 320 and closes an appropriate set of contacts in the thousands contact tree (not shown, but obvious from the discussion of the "tens" tree as set forth hereafter).

As hold relay 210 restores, the operating circuit for the energized one of the counting chain relays (relay 230 in the present example) is restored and the circuit to the thousands marking relays is interrupted. However, the thousands group control of relay 320, which was shunted during the previous period by the original energizing circuit for the effective thousands marker relay 305, now operates in series with relay 305 over an obvious circuit, extending from register ground over the winding of relay 320, contacts 306 and the winding of relay 305 to battery.

Series control relay 320 for the thousands group operates and at its contacts 321, 323, 325 and 327 disconnects the counting chain marking conductors 294—297 from the thousands marker relay group and at its contacts 322, 324, and 326 and 328 connects the counting chain markers 294—297 to the hundreds marker relay group (H1—HA) preparatory to receipt of the "hundreds" digit of the calling party number.

Although in the specific example chosen, the thousands digit of the calling subscriber's directory number was digit "2," it will be apparent that the counting chain operates in a similar manner for each of the digits 1–0. In order to avoid unduly complicating the discussion, the further operation of the counting chain of relays 200—280 and their associated contacts is presented in the form of a chart in which the first column represents the desired thousands digit, and the second column indicates the operation of the relays of the counting chain, and its controlling circuit in response to the open and closed periods of the associated pulse.

It will be remembered that recorder pulsing relay 125 pulses register relay 200 and advances the chain to a unit consistent with the number of incoming impulses received. The unit of the chain which is operated, in turn, determines the marking relay of a group which is operated as the chain is released following receipt of the incoming digit. The marking groups are rendered effective in their natural sequence (thousands, hundreds, tens, units) by the series control relays, such as 320 and 370, etc. associated with the groups.

With reference to the following chart those relays which are underlined are deemed to be deenergized because of the release of relay 125. Those relays which are not underlined are deemed to be energized through appropriate relay contact holding circuits apparent to those skilled in the art.

*Chart I*

*Counting chain relay response*

| Digit | Relays | |
|---|---|---|
| 1st Pulse | open | 125—200—205—210 |
| | closed | $\underline{620}$—$\underline{200}$—220 |
| 2nd Pulse | open | 125—200—220—230 |
| | closed | $\underline{125}$—$\underline{200}$—$\underline{220}$—230 |
| 3rd Pulse | open | 125—200—230—240 |
| | closed | $\underline{125}$—$\underline{200}$—$\underline{230}$—240 |
| 4th Pulse | open | 125—200—240—250 |
| | closed | $\underline{125}$—$\underline{200}$—$\underline{240}$—250 |
| 5th Pulse | open | 125—200—250—260 |
| | closed | $\underline{125}$—$\underline{200}$—$\underline{250}$—260 |
| 6th Pulse | open | 125—200—260—270—280 |
| | closed | $\underline{125}$—$\underline{200}$—$\underline{260}$—270—280 |
| 7th Pulse | open | 125—200—$\underline{270}$—280 |
| | closed | $\underline{125}$—$\underline{200}$—$\underline{270}$—280—220 |
| 8th Pulse | open | 125—200—280—220—230 |
| | closed | $\underline{125}$—$\underline{200}$—280—230 |
| 9th Pulse | open | 125—200—280—230—240 |
| | closed | $\underline{125}$—$\underline{200}$—280—$\underline{230}$—240 |
| 10th Pulse | open | 125—200—280—240—250 |
| | closed | $\underline{125}$—$\underline{200}$—280—$\underline{240}$—250 |

The following chart is a summary of the various paths through which current flows to energize any one, or an appropriate combination of the thousands marker relay group 300—315 to effect the registration of the dialed thousands digit. The manner in which the other digits are registered by the other groups will be obvious from such chart.

*Chart II*

| Digit | Paths |
|---|---|
| | Chain Relay 1 Marks Conductor 294 |
| 1 | Ground, contracts 203, 208, and 226, conductor 294, contacts 371 and 321, and the winding of first thousands relay 300 to register battery 302. |
| | Chain Relay 2 Marks Conductor 295 |
| 2 | Ground, over contacts 203, 208 and 239', conductor 295, contacts 373 and 323 and over the winding of second thousands relay 305 to register battery. |
| | Chain Relay 3 Marks Conductor 296 |
| 3 | Ground, over contacts 203, 208 and 249', conductor 296, contacts 375 and 325, and over the winding of third thousands relay 310 to register battery. |
| | Chain Relay 4 Marks Conductor 297 |
| 4 | Ground, over contacts 203, 208, and 259', conductor 297, contacts 377 and 327, and over the winding of fourth thousands relay 315 to register battery. |
| | Chain Relay 5 Marks Conductors 294, 295 |
| 5 | Ground, over contacts 203 and 208, and thence over the parallel paths of contacts 266 and 267 over conductors 294, 295; contacts 371, 373; contacts 321, 323; and over the windings of first and second thousands relays 300 and 305 to register battery. |
| | Chain Relay 6 Marks Conductors 294, 296 |
| 6 | Ground, over contacts 203, 208 and the parallel paths afforded by contacts 275 and 276 as follows; over conductors 294 and 296, contacts 371, 375, 321 and 325, and over the separate windings of the first and third thousands relays 300 and 310 to register battery. |
| | Chain Relays 1 and 6A Mark Conductors 294, 297 |
| 7 | Ground, over contacts 203, 208 and 226, conductor 294, contacts 371, and contacts 321, and over the winding of the first thousands relay 300 to register battery; ground, over contacts 203, 208, 284 and 225, conductor 297, contacts 377 and 327, and over the winding of the fourth thousands relay 315 to register battery. |
| | Chain Relays 2 and 6A Mark Conductors 295, 296 |
| 8 | Ground, over contacts 203, 208 and 239', conductor 295, contacts 373 and contacts 323, and over the winding of second thousands relay 305 to register battery; and ground, over contacts 203, 208, 284 and 239, conductor 296, contacts 375 and 325, and over the winding of the third thousands relay 310 to register battery. |
| | Chain Relays 3 and 6A Mark Conductors 296, 297 |
| 9 | Ground, over contacts 203, 208 and 249', conductor 296, contacts 375 and 325, and over the winding of the third thousands relay 310 to register battery; and ground, over contacts 203, 208, 284 and 249, conductor 297, contacts 377 and 327, and over the winding of the fourth thousands relay 315 to register battery. |
| | Chain Relays 4 and 6A Mark Conductors 295, 297 |
| 0 | Ground, over contacts 203, 208 and 259', conductor 297, contacts 377 and 327, and over the winding of the fourth thousands relay 315 to register battery; and ground, over contacts 203, 208, 284 and 259, conductor 295, contacts 373 and 323, and over the winding of the second thousands relay 305 to register battery. |

In summarizing the above chart it will be noted that for the digits 1–4 only a single one of the relays 300—315 is energized, and completes a holding circuit from register battery through its respective winding, one of its lower contacts, and the winding of thousands relay 320 to register ground. For the other digits 5–0 a combination of two of the relays 300—315 is operated, and in this latter case the two relays complete holding circuits in a manner similar to that described with reference to the digits 1–4.

As has been previously noted the register circuit is so arranged that after the appropriate relay, or relays 300—315, have been energized, relay 210 which is a slow acting relay releases and opens its contacts 211 and 212 to release the counting chain and prepare the counting chain for the next digit to be dialed.

The relay contact tree for the thousands relays is identical to the relay contact tree of the tens relays, which is illustrated in the lower right hand corner of Figure 3. Inasmuch as the relay contact trees associated with the thousands, hundreds, and tens relays are identical, and the pattern of operation of the associated relays is the same for the various digits, a tracing of the circuits through the tens contact tree should suffice to explain the operation of the respective contact trees for each of the groups of relays.

The following chart is a simplified illustration of the effect of dialing each of the digits 1–0 in the tens group upon the tens relays and the manner in which each lead 380—389 is connected to ground. It is assumed that relays 400 and 410 shown in Figure 4 have been operated in a manner to be more fully explained hereinafter.

*Chart III*

| Digit | Relays Operated | Path to Lead |
|---|---|---|
| 1 | 330 | Ground, over contacts 411 (Figure 4), contacts 405, conductor 391, contacts 332, 338, 348 and 358 to lead 1 (383). |
| 2 | 335 | Ground, over contacts 411, and 405, conductor 391, contacts 333, 339, 350 and 360 to lead 2 (386). |
| 3 | 345 | Ground, over contacts 411 and 405, conductor 391, contacts 333, 340, 351 and 362 to lead 3 (388). |
| 4 | 355 | Ground, over contacts 411 and 405, conductor 391, contacts 333, 340, 352 and 363 to conductor 4 (389). |
| 5 | 330 and 335 | Ground, over contacts 411 and 405, conductor 391, and contacts 332 and 337 to conductor 5 (380). |
| 6 | 330 and 345 | Ground, over contacts 411 and 405, conductor 391, contacts 332, 338 and 347 to lead 6 (381). |
| 7 | 330 and 355 | Ground, over contacts 411 and 405, conductor 391, contacts 332, 338, 348 and 357 to lead 7 (382). |
| 8 | 335 and 345 | Ground, over contacts 411 and 405, conductor 391, contacts 333, 339 and 349 to lead 8 (384). |
| 9 | 345 and 355 | Ground, over contacts 411 and 405, conductor 391, contacts 333, 340, 351 and 361 to lead 9 (387). |
| 0 | 335 and 355 | Ground, over contacts 411 and 405, conductor 391, contacts 333, 339, 350 and 359 to lead 0 (385). |

While the contact tree which has been described is specific to the operation of the tens relays (330—355), it will be apparent to those skilled in the art as to how a similar contact tree is utilized with the thousands relays 300—315, and the manner in which a selected thousands digit (1–0) will have its conductor connected to ground through the contacts of control relays 400 and 410.

In the specific example set forth, the thousands digit of the calling subscriber's directory number, was digit "2" and as a result the second marker relay 305 of the thousands group and the series control relay 320 will be in the operated condition to indicate such value.

The series control relay 320 for the thousands relay group was effective in its operation to render the hundreds digit register (indicated by H1—HA but not shown in detail) effective to mark the value of the next digit of the calling party's number.

REGISTRATION OF HUNDREDS DIGIT

As the calling party now dials the hundreds digit of his own directory number ("1" in the present example), the representative impulses effect pulsing of the recorder relay 125 a corresponding number of times. Recorder relay 125, in turn, operates register line relay 200 a like number of times to effect advancement of the counting chain relays 220—290 a corresponding number of steps as set forth in the discussion of the registration of the thousands digit.

As indicated in Chart I, following receipt of digit "1" the counting chain relay 220 will be in the operated condition, and as shown in Chart II, conductor 294 will be prepared for marking.

A brief period after register relay 200 restores, associate hold relay 205 will restore, such period being determined by the slow to release characteristics of the relay 205. As hold relay 205 restores it is effective at its contacts 208 to complete the marking circuit prepared by the effective one of the counting chain relays (the first relay 220 in the present example).

As shown in Chart II marking conductor 294 is marked whenever the digit "1" is registered on the counting chain. As a result of the marking of conductor 294, the first relay of the hundreds marker group (H1—not shown) is operated in a manner which is obvious from the discussion previously set forth relative to the thousands marker group.

A contact tree (not shown) which is identical to that shown in the matter of the "tens" relays and described hereinbefore with respect to the operation of the thousands relays, is marked by the H1 relay, to indicate that the hundreds digit received by the recorder was "1."

Immediately following registration of the received hundreds digit "1," relay 210, which is a slow release relay, restores, and at its contacts 212 effects restoration of the effective one(s) of the counting chain relay(s) (the first relay 220 in the present example). The effective counting chain relay 220 restores and at its contacts 226 interrupts the marking circuit to the H1 relay of the hundreds group.

A series control relay for the hundreds group (similar to series control relay 320 of the thousands group) operates in series with the effective one of the hundreds marking relays (H1 in the present example) as the shunt provided by the original energizing circuit for relay H1 is removed by the restoration of the counting chain.

The series control relay for the hundreds group operates and at its contacts disconnects the marking conductors 294—297 from the hundreds digit register and connects same to the tens digit register, which as illustrated, comprises relays 330—355.

REGISTRATION OF THE TENS DIGIT

As the impulses representative of the calling party tens digit are received (digit 5 in the present example), pulsing relay 125 of recorder 113 operates in the manner previously described to operate relay 200, and its associated relays 205 and 210 in the advancement of the counting chain relays 220—260. With reference to Chart I, it is apparent that counting chain relay 260 will be operated following receipt of the fifth impulse. With reference to Chart II, it will be apparent that marking conductors 294 and 295 are prepared for marking.

Specifically, following termination of the open period of the fifth pulse, register relay 200 restores, and a brief period thereafter slow to release relay 205 restores to effect marking of the conductors 294 and 295 as prepared by the effective counting chain relay 260.

As a result of the marking conductors 294 and 295, the tens marker relays 330 and 335 are operated over the following paths: (1) negative battery, the winding of relay 335, the appropriate contact of the hundred series control relay HA, contacts 373, conductor 295, contacts 267, 208 and 203 to ground; and (2) negative battery, the winding of relay 330, the appropriate contact of relay HA, contacts 371, conductor 294, contacts 266, 208 and 203 to ground.

As indicated in Chart III, relays 330 and 335 are effective at contacts 332 and 337 to select the tens marking conductor 380 (digit 5) for marking purposes.

Upon subsequent release of slow to release relay 210, the operated one(s) of the counting chain relays are restored (260 in the present example.) The counting chain relays in restoring effect removal of the shunt circuit for the tens series control relay 370, which now operates in series with the effective one(s) of the tens register relays (330 and 335 in the present example). Series control relay 370 operates and at its contacts 371, 373, 375 and 377 disconnects the marking conductors 294—297 from the tens register and at its contacts 372, 274, 276 and 378 connects the marking conductors to an operating circuit for units control relay 290.

REGISTRATION OF THE UNITS DIGIT

The register relay arrangement of the present invention is designed to utilize a minimum of separate relays and to accomplish this aim the "units" digit is registered on separate contacts 221—282 of the register counting chain. In this manner one less register is required. It should be understood that while the upper contacts 221—282 forming the units contact tree are operative whenever any of the counting chain relays are energized, they perform no function until units control relay 290 is operated responsive to complete receipt of the units digit.

Specifically, as the calling subscriber dials the units digit of his own directory number ("0" in the present example) pulsing relay 125 of recorder 113 operates in response to the open and closed periods of the dialing contacts, and contorls register relay 200 to advance the counting chain a corresponding number of steps. With reference to Chart I it is noted that after receipt of the open period of the sixth pulse, chain cycle relay 280 is operated, and is held in an energized condition by the locking circuit which extends from native battery over its own winding, and contacts 283 and 211 to ground. With reference to Chart II, it is apparent that as the open period of the tenth pulse is terminated, the fourth counting chain relay 250 and the chain cycle relay 280 are in the energized condition, and conductors 295 and 297 are prepared for marking.

After the elapse of a brief period of time, register relays 200 and 205 restore, and at their contacts 203 and 208 complete an operating circuit for units control relay 290 which extends from negative battery over the winding of relay 290, conductor 218, contacts 374 and 378, conductors 295 and 297, contacts 259, 259′, 284 and contacts 208 and 203 to ground. Relay 290 operates and at its contacts 291 locks itself to register ground; at its contacts 292 prepares a locking circuit for the effective one of the counting chain relays (250 in the present example) and at its contacts 293 prepares an operating circuit for guard relay 410. At its contacts 293′ relay 290 applies ground over contacts 283 to hold relay 280 energized upon the release of relay 210 and the removal of ground over contacts 211 thereof.

As hold relay 210 restores following the elapse of a time period consistent with its slow to release characteristics, it is effective at its contacts 212 to interrupt the original operating circuit for the fourth counting chain relay 250. The operated chain relay (250 in the present example) is held operated after release of the hold relay 210 in that the chain is now a register. The holding circuit therefor extending from battery, over the winding of relay 250, contacts 257, 265, 274, 292 and 291 to register ground.

As previously indicated the register counting chain is used as the units digits register. Thus, in this case the fourth counting chain relay 250 and the cycle relay 280 having been operated, contacts 254 and 282 are closed to prepare marking of the "0" units marking conductor.

At this point the digits 2150 of the calling party directory number are recorded on the thousands, hundreds, tens, and units registers, and their associated contact trees are prepared so that a marking signal may be applied to the appropriate marking leads of each of the registers in a manner to be described hereinafter.

SEIZURE OF CHECK CONNECTOR

As the units control relay 290 operated, it was effective at its contacts 293 to close a seizing circuit to the guard relays for check connector 228. It is first assumed that the check connector circuit has not been seized by any other register and is lying idle in preparation for seizure. Thus, as the seizing circuit is extended to guard relay 410, the relay operates over a circuit which extends from negative battery, over the winding of guard relay 410, conductor 216, contacts 293, conductor 217, contacts 414, conductor 435, contacts 511, conductor 434, contacts 423 and the series contacts of the other guard relays (not shown) to contacts 412' and ground.

Guard relay 410 operates and at its contacts 411 prepares for the connection of ground to the prepared marking circuits of the thousands, hundreds, tens, and units contact trees, and at its contacts 412, completes an operating circuit to the winding of test relay 400, the operating circuit extending from negative bettery over the winding of relay 400 and contacts 412 to register ground.

Test relay 400 operates, and at its lower contacts 404—407 applies ground to the prepared ones of the thousands, hundreds, tens, and units marking conductors, for the purpose of causing the check connector to select the P-wire of the line which corresponds to the directory number registered, as explained more fully hereinafter; and at its upper contacts 401—403, connects the test conductors 148—150 of the recorder 113 to conductors 431—433 of the check connector.

A second seizure of the same idle check connector by another register circuit, such as illustrated circuit 209, is prevented in that ground is removed from conductor GA (434) as soon as one of the guard relays such as 410 operates and opens its contacts such as 413. As an example, if the second register operates its associated guard relay 420 in an attempt to seize the check connector while it is being used by the first register, guard relay 420 will not find energizing ground on conductor 434 and will not operate. As shown hereinafter, the check connector further protects itself as it operates by opening its contacts 511 in the guard circuit. In effect there is thereby established a sequential operation of check registers which separately seize the idle check connector without interfering with one another.

CHECK CONNECTOR

(1) GENERAL OPERATION

In general, the check connector of the present invention comprises a test circuit which is arranged to test a loop which includes the P-wire of the calling line for verification of the number dialed. The loop extends from the oscillator 509 of the test circuit over the contacts of relays which are operated in response to the ground applied to the prepared marking conductors of the thousands, hundreds, tens and units contact trees, over conductor 109 to the P-wire of the calling subscriber's line circuit, over the P-wire 108 as extended over the line finder-selector link 102, 103 to the recorder and over conductors 149 and 433 to the oscillator 509.

In the event that the calling subscriber has correctly dialed his own directory number, the oscillator 509 continues to operate in a manner to be described in greater detail hereafter, and under the control of appropriate relays, contacts 111 and 112 are closed to permit further extension of the connection toward the desired party.

If, on the other hand, the calling subscriber has incorrectly dialed his own directory number, oscillator 509, which had been oscillating over a local circuit, ceases to oscillate, and the appropriate control relays operate in an alternative manner to block the connection at the recorder 113, and to place the calling subscriber's line on lockout.

(2) CHECK CONNECTOR MARKING EQUIPMENT

Figure 5:
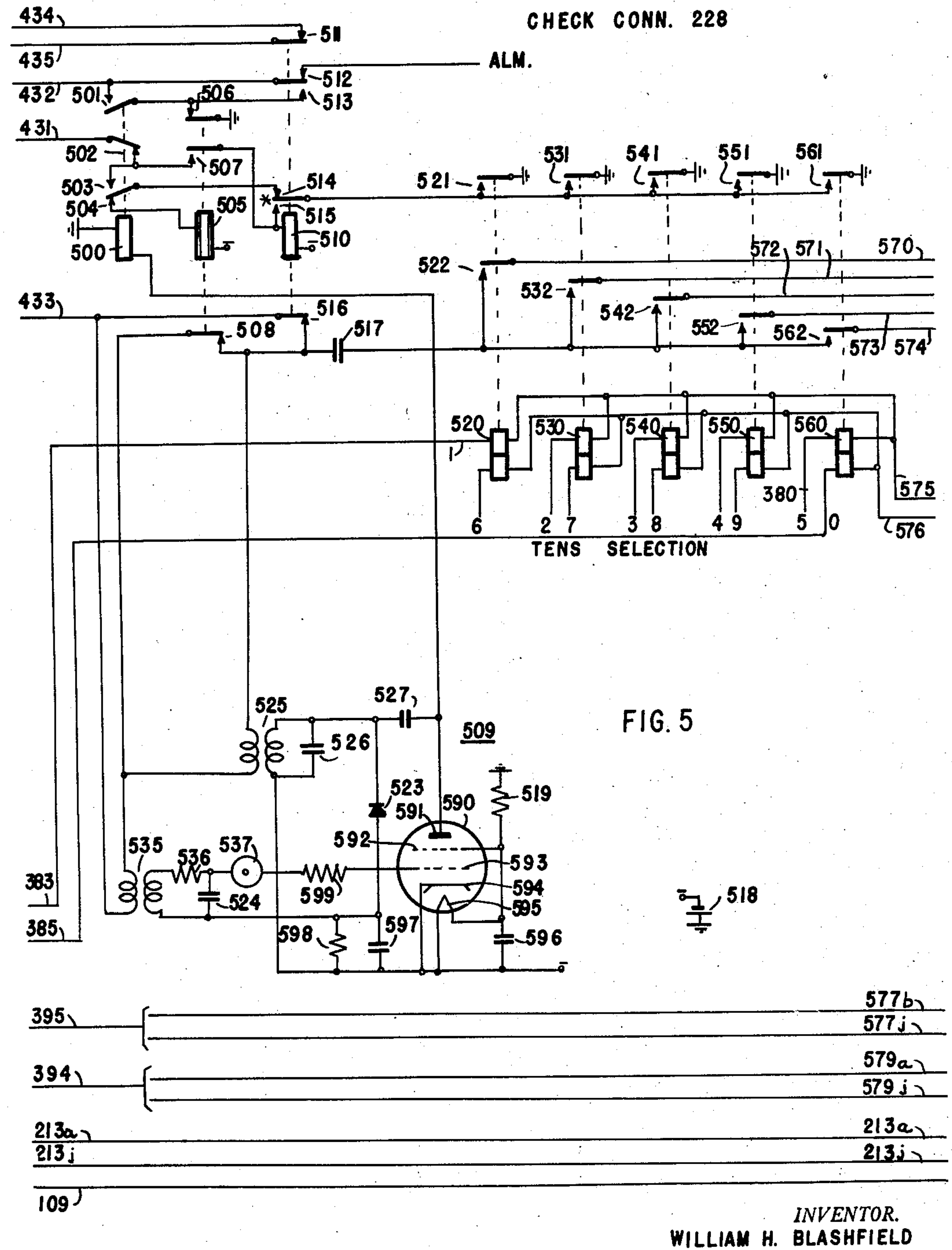
Figures 5 and 6 are schematic diagrams of the check connector which completes the calling loop to verify the calling subscriber's number.
Figure 6:
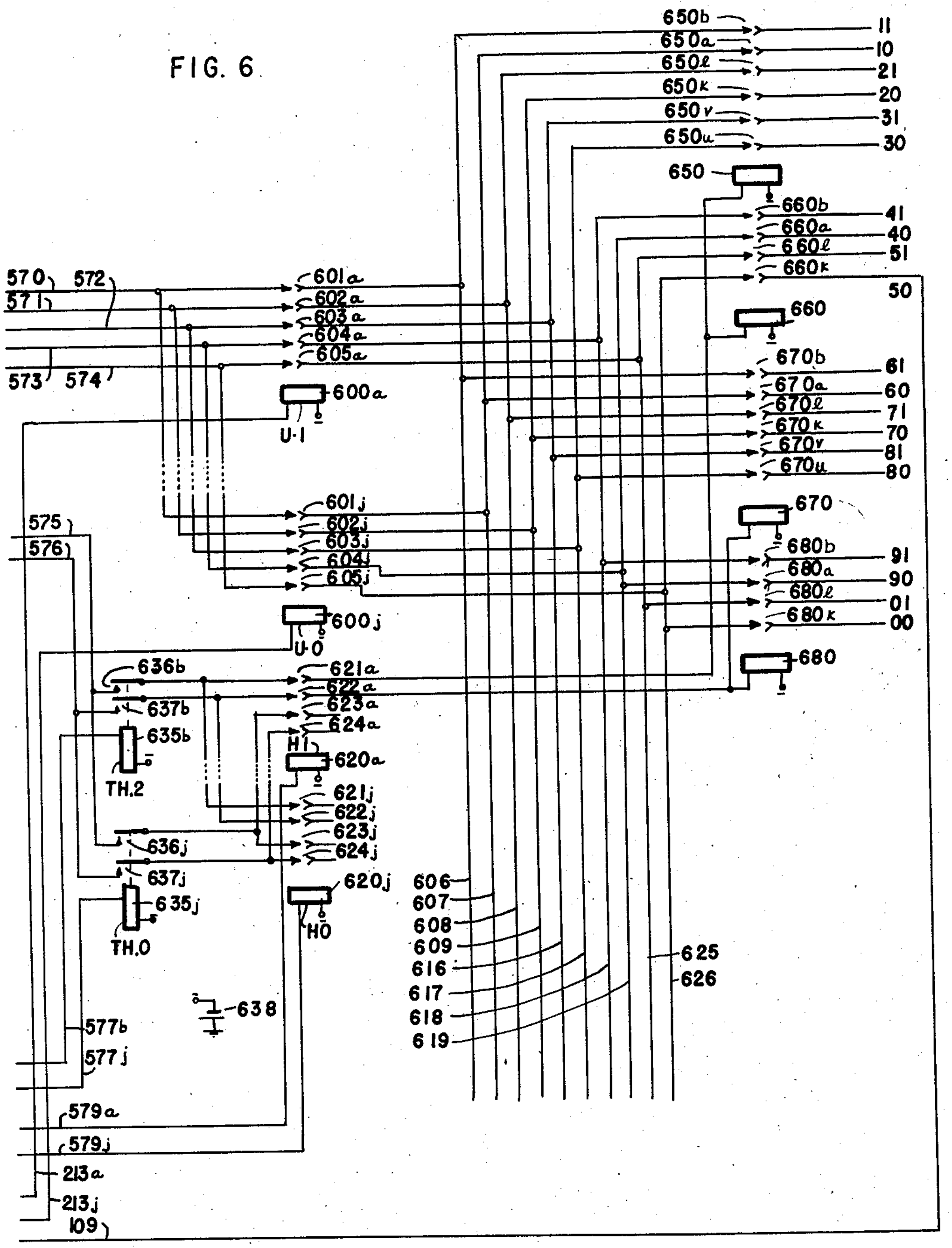

The selection of the P-wire of the line which corresponds to the directory number which has been registered on the register 209, is effected by the marking equipment which is shown in Figures 5 and 6 responsive to connection of the register 209 thereto. As the P-wire corresponding to the registered directory number is seized by this equipment, it is immediately connected in the aforedescribed loop to the oscillator equipment for the purpose of an applying tone signal for checking purposes. The general arrangement of the connector marking means and its manner of operation are now set forth hereat.

Briefly, the connector marking equipment in a system having ten thousand subscriber lines comprises:

(*a*) A set of thousands relays TH1—TH0 (there being one relay per thousands group of subscribers) for selecting the particular thousands group of P-wires which includes the registered line;

(*b*) A set of ten "hundreds" relays H1—H0 (**620*a*—620*j***) which are operative to select a corresponding hundreds group of lines of the thousands line group first selected. Each of the ten relays in the hundreds group has associated therewith as many pairs of contacts as there are thousands groups so that with its operation the hundreds relay extends the same circuit groups to the contacts of each "thousands" relay.

(*c*) A number of specific sets of tens marking relays, each set comprising four relays, for each one hundred group of lines such as illustrated relays 650, 660, 670 and 680 for the first hundred group of the second thousands group. A set of five "tens" relays 520—560 is common to all of the four specific sets for the tens group and are operative therewith to mark the value of the registered tens digit.

(*d*) A set of ten "units" relays U1—U0 (**600*a*—600*j***) for marking the units digit of the registered number as received.

It will be recalled that as the check connector is seized, the contact trees of the thousands, hundreds, tens and units registers are energized simultaneously by the test relay 410. The energization of the register contact trees in this manner effects the transfer of the markings on the respective registers to the above-described connector marking equipment for the purpose of selecting the corresponding one of the subscriber P-wires out of the ten thousand P-wires available to the check connector.

The actual transfer of the markings from the registers to the connector marker equipment is accomplished over conductor groups, such as **395, 394, 213*a* and 383, which extend between the registers and the connector marking equipment. In operation, the thousands register effects marking of the thousands digit on the corresponding one of the connector thousands relays TH1—TH0 (TH1 not shown), the hundreds register effects marking of the hundreds digit upon the corresponding one of the connector hundreds relays H1—H0, and the tens register effects transfer of the "tens" digit registered thereon to the corresponding one of the common tens selection relays and the particular set of specific tens relays which is associated therewith, as more fully described hereinafter. The register counting chain (acting as a units register) effects transfer of the units digit registered thereon to the connector units marking relays U1—U0. The transfer of the thousands, hundreds and units marking is effected immediately with seizure of the test connector. The marking of the relays of the common tens group 520—560, and the specific set of tens relays, such as 650—680**, is effected immediately thereafter in the selection of the desired P-wire.

In the present example, the thousands digit "two" of the directory number, which is recorded on the thousands register, will in its transfer to the connector marking equipment effect the operation of the second thousands relay 635*b*. The digit "one" of the directory number, which is registered on the hundreds register, will in its transfer to the connector marking equipment effect the operation of the first hundreds relay H1 (620*a*). The digit "five" of the directory number registered on the tens register will in its transfer to the connector marker equipment effect the operation of the common tens selection relay 560 and the specific tens relays 650, 660.

Digressing momentarily, the nature of the marking of the "tens" digit in the connector and the specific manner in which a minimum number of marking units are required for effecting expeditious marking in the connector will be apparent from the following disclosure. The specific relays 650, 660 are connected to be operated whenever the "tens" designator of a calling line is within the fifty group of lines 11—50; the specific relays 670 and 680 are connected to be operated whenever the tens designator for the calling line is in the fifty group of lines identified as 61–00. The common tens relays, five in number, indicate the particular group of tens of the group of fifty selected as above indicated. The upper windings of these relays indicate the first, second, third, fourth and fifth tens group, respectively; and the lower windings indicate the sixth, seventh, eighth, ninth and tenth groups, respectively. Thus, in the present example wherein the "hundreds" digit has been assumed to be "five," the specific relays 650, 660, which are indicative of the first fifty group of lines, will operate and the fifth relay 560 of the common tens group will operate to indicate that the fifth tens group of the fifty selected is desired.

In summary, (1) If the "tens" digit register is 1–5, the specific relays 650, 660 are energized in series with the particular one of the common relays 520—560 which correspond to the value of the registered number.

(2) If the value of the registered tens digit it 6–0, the specific relays 670 and 680 are energized in series with the specific one of the common relays 520—560 which correspond to the value of the registered number.

(3) The specific relays 650 and 660 are effective at their contacts 650*a*—660*t* (relay 650 being operative to extend thirty lines, and relay 660 being operative to extend 20 lines) to extend the P-wires of the first fifty lines (10–59) to the contacts of the units relays. Similarly, relays 670 and 680 as operated are effective at their contacts 670*a*—680*t* to extend the last fifty lines (60–09) to the contacts of the units relays.

(4) The particular one of the common tens relays extends the particular tens group of the fifty lines selected by the specific relays to the contacts of the units relays.

The "units" digit registered on the register counting chain (acting as the units register) is transferred to the units register relays U1—U0 (600*a*—600*j*) and operates the one of these relays which corresponds to the value of the digit. Thus, in the present example, the units digit "0," as transferred from the register 209 to the check connector, will effect operation of the tenth units relay 600*j* which operates and at its contacts 601*j*—605*j* extends the P-wires of each of the five wires of the selected fifty group having the designation "0" (P-wires 10, 20, 30, 40, 50, or alternatively 60, 70, 80, 90, 00) to contacts of the common tens relays 520—560 which, in turn, extend the one of these lines which has the tens digit corresponding to the operated one of the common tens selection relays.

The nature of this general operation may be summarized in the following manner:

First digit—selects a group of one thousand out of ten thousand lines;

Second digit—selects a group of one hundred out of the one thousand lines selected;

Third digit—selects a group of fifty from the one hundred lines and simultaneously marks the group of ten of the fifty lines selected, which includes the desired line; and Fourth digit—selects five lines from the group of fifty lines selected, the one of said five lines which is connected to the marked ten-line group, being the desired line.

The unusual arrangement of the tens relays in which two groups of relays 520—560 and 650—680 are utilized permits the use of the conventional 30-wire multiple between the tens and units relays. As a result, the normal bare-wire front multiple may be used, since the check connector has been specifically arranged to utilize to the fullest advantage the 33-point relays for one-wire selection on a decimal basis. This scheme results in the most economical and straight forward approach and eliminates the use of special relays for the selection of the particular P-wire out of the total number of P-wires available to the check connector.

The specific manner in which the marking equipment of the check connector is operative will be apparent from the more specific example now set forth hereat in which the nature of the operation of the equipment will be described as the calling directory number 2150, previously registered on the register 209, is transferred to the connector marking equipment with seizure thereof.

(3) DETAILED OPERATION OF CHECK CONNECTOR

It will be remembered that the thousands, hundreds and units registers have output leads similar to the tens register output leads 1–0, and the following discussion is predicated on the assumption that the output leads of these registers which correspond to the digits 2150, were marked by the test relay 400 upon seizure of the check connector.

Briefly as test relay 400 operated to seize the check connector, it was effective at its contacts 407 to extend ground to conductor 393, over the contact tree of the thousands relays 300—315, the output lead of the contact tree corresponding to digit "2" in the thousands register, conductor group 395, and conductor 577*b*, and the winding of the second thousands relay 635*b* to check connector battery.

The second thousands relay 635*b* operates, and at its contacts 636*b* and 637*b* prepares a circuit for the various sets of four "tens" relays associated therewith (there being a set of four for each one hundred group of the thousands group, or a total of forty relays).

Simultaneous with marking of the thousands group in the check connector, the test relay 400 was also effective at its contacts 406 to extend marking ground over conductor 392 to the contact tree of the hundreds register. Since the hundreds digit of the calling line is "1," register relay H1 has been operated in the manner described, and the first hundred relay 620*a* in the check connector is operated, the circuit extending from battery, over the winding of relay 620*a*, conductor 579*a*, conductor group 394, lead 1 (not shown) of the hundreds contact tree, the appropriate contacts of the contact tree of the hundreds register (not shown), conductor 392, contacts 406, contacts 411 and to ground. The first hundreds relay 620*a* operates and at its contacts 621*a*—624*a* prepares a circuit for the set of four relays 650—680 associated therewith.

As indicated above, transfer of the "tens" digit on the tens register is effected simultaneously with the transfer of the thousands and hundreds digits from the register to the connector. Specifically as test relay 400 operates to seize the check connector, it is effected at its contacts 405 to extend marking ground over conductor 391 to the tens register contact tree. Since the tens digit of the calling line is "5" in the present example, the "tens" register relays 330, 335 are in the operated condition. As a result an energizing circuit is completed for the tens relays 650—660 in the check connector in series with the fifth relay 560, the circuit extending from check connector battery, over the parallel combination of the windings of relays 650 and 660, contacts 621a of the operated hundreds relay 620a, contacts 636b of the operated thousands relay 635b, over conductor 575, over the upper winding of relay 560, conductor 380, contacts 332 and 337, conductor 391, contacts 405 and to ground over contacts 411 of relay 410. Relays 650, 660 operate and at their contacts 650a—650d' (not shown) and 660a—660t (not shown) extend the first group of fifty conductors of the first hundred group in the second thousand group to the contacts of the units relays 600a—600j.

The fifth common tens relay 560 operates and at its contacts 562 prepares to extend the one of the five lines (as next selected by the units relays) which is in the fifth tens group to the oscillator 509.

The transfer of the units digit to the check connector marking elements is accomplished at the same time. Specifically, in the present example, the units digit of the directory number is "0," and accordingly the tenth units relay 600j is operated over the following circuit; battery, the winding of relay 600j, conductor 213j, contacts 254, contacts 282, conductor 215, contacts 404 and thence over contacts 411 to ground.

The tenth units relay 600j operates and at its contacts 601j—605j extends the five lines of the selected fifty group which have the digit "0" (10, 20, 30, 40, 50 in the present example) toward the contacts of the common tens relays 520—560. Since only the fifth common relay 560 has been operated, only the P-wire of line "50" of the five lines forwarded is extended to the oscillator 509.

The P-wire associated with the directory number 2150 is now connected to the oscillator over the following circuit: P-wire 2150, contacts 660k, 605j, conductor 574, contacts 562 and capacitor 517 to input winding 525 of oscillator 509.

The manner in which the verification test is made by the oscillator unit will now be discussed.

(4) OSCILLATOR CIRCUIT

The oscillator circuit 509 is of the tuned grid-tuned plate type having a feed back circuit coupled between the tuned circuits of the grid and plate. The oscillator 509 comprises an electron discharge tube 590 of the tetrode type, such as the conventional 50L6 vacuum tube or its equivalent. Electron discharge device 590 has a heating element or filament 595 connected to check connector battery 518 and to ground through a dropping resistor 519. An indirectly heated cathode 594 of electron discharge tube 590 is connected to check register battery 518. A tuned circuit comprising the secondary winding of a transformer 535 and a capacitor 524 is connected between grid 593 and cathode 594. A screen grid 592 is maintained at a potential slightly positive with respect to that of the cathode by an amount equal to the voltage drop in filament 595. A second tuned circuit comprising the secondary winding of a transformer 525 and a capacitor 526 is coupled to cathode 594 and through a D.C. blocking condenser 527 to anode 591 of electron-discharge tube 590. Anode 591 is additionally connected to ground through the winding of a relay 500. A rectifier 523, which may be of the conventional copper oxide type or its equivalent, is connected between the tuned circuit of the anode and the tuned circuit of the grid for the purpose of rectifying the oscillatory current generated in oscillator 509 and producing a grid bias on electron discharge device 590 which is of an amount and polarity to reduce the current flowing therethrough from approximately 35 or 40 milliamperes to approximately three or four milliamperes when the tube is oscillating. A feed back circuit comprising the series connection of the primary windings of transformers 525 and 535 is provided to permit the proper operation of electron discharge device 590 as an oscillator. The primary winding of transformer 525 is normally shorted through contact 508 of relay 505 prior to the operation of relay 505.

At this point in the discussion it will be recalled that as the check connector was seized line conductors 148, 149 and 150 were switched into the check connector circuit 228. It is also recalled that as the selected one of the common tens relays is operated to switch through the P-wire corresponding to the number registered (relay 560 in the present example), it is also effected at its contacts 561 to complete an operating circuit for connector relay 505 which extends from battery over the winding of relay 505, contacts 504, 514 and the contacts of the operated common "tens" relay (561 in the present example) to ground. Relay 505 operates and at its contacts 508 removes the short across the primary winding of transformer 525 and allows the oscillator circuit 509 to function over a local circuit which extends as follows: the primary winding of transformer 525, over contacts 516 of relay 510, and through the primary winding of transformer 535 to the primary winding of transformer 525. Relay 505 at its upper contacts 506, also prepares a connection from ground to contacts 501 of relay 500 and at its contacts 507 prepares an operating circuit for relay 510.

With the operation of the oscillator 509, the oscillatory voltage therein produced is rectified by rectifier 523 and produces a grid bias to reduce the plate current flowing through electron discharge tube 590 to a value of about three or four milliamperes, so that relay 500 releases. Upon its release relay 500, at its contacts 504 opens the circuit to the windings of slow release relay 505, and at its contacts 503 completes an energizing circuit for relay 510 which extends from battery over the winding of relay 510, contacts 507, 503, 514 and 561 to ground. Relay 510 operates and at its make-before-break contacts 514 and 515 locks itself over contacts 561 to ground; and at its contacts 512 prevents connection of ground to the alarm circuit (not shown), and at its contacts 513 prepares a single circuit for the register and at its contacts 516 opens the local circuit which connects the primary of transformer 535 and the primary of transformer 525 in series and permits the oscillation of oscillator circuit 509. Under these conditions the oscillator circuit 509 will continue to oscillate only if the primaries of transformers 535 and 525 are connected in series over the external P-wire circuits of the toll ticketing arrangement as shown in the accompanying figures. Specifically if the calling party has dialed his own number, a path for the feed back circuit between the tuned grid and tuned plate circuits is provided as follows: the upper end of the primary winding of transformer 525, through blocking condenser 517, over contacts 562, conductor 574, contacts 605j, 660k, conductor 109 (which may be traced over Figures 6, 5, 4, 3, 2 and 1A to the P-wire of the line circuit 101 for the calling subscribers substation), through line finder-selector 102—103, over conductor 108, recorder 113, conductor 149, contacts 403, and conductor 433, to the primary winding of transformer 535 and thence to the primary winding of transformer 525. In this manner a closed loop is completed to permit feed back between the anode and grid circuits, and the oscillatory circuit 509 continues to oscillate. As previously explained, rectifier 523 rectifies the oscillatory current flowing in circuit 509, and by maintaining a negative grid bias upon grid 593, prevents the cathode to plate current from rising to a value sufficient to operate relay 500.

It will be recalled that upon the operation of relay 505, relay 500 is released and at its contacts 504 removes ground from the winding of relay 505, and after an appropriate period related to its slow release characteristics, relay 505 is de-energized. Relay 505 restores and at its upper contacts 506 applies ground over contacts 501, conductor 432, contacts 402 and conductor 148, over contacts 143 and through the winding of relay 130 to register battery 152 to energize register relay 130. Register relay 130 operates and at its upper contacts 131 removes ground from the winding of register relay 140 and at its lower contacts 132 locks to ground. Relay 130 is operative at contacts (not shown) to switch the transmission circuit through recorder 113 to ticketing selector 114 and thence to exchange 82 in the manner previously explained.

Register relay 140 restores and at its contacts 141, 142, 143 and 144 releases the check register and check connector. Specifically, relay 140 at its contacts 141 effects the release of the operated register relays 290, 300, 320, the operated hundreds relays, relays 330, 335 and 370.

Relay 290 restores and at its contacts 292 opens the operating circuits for relays 250 and 280 and at its contacts 293 opens the operating circuit for relay 410. Relays 280 and 250 restore. Relay 250 at its contacts 254 removes ground from the operating circuit of relay 600*j* which restores and at its contacts 601*j*—605*j* opens the tone check circuit and prepares for the reception of another call.

Relay 300 restores and at its contacts in the contact tree (not shown) prepares these contacts for the reception of the next call. Relay 320 restores and at its contacts 321, 323, 325 and 327 prepares a circuit for the next call. The operated hundreds relays restore and prepare circuits for the next call. Relays 330, 335 and 370 restore and at their contacts 332, 337 and 371—378 prepare circuits for the next call.

Relay 410 restores and at its contacts 411 removes ground from the marking leads of the thousands, hundreds and tens contact trees, and at its contacts 412 removes ground from the operating circuit of relay 400 which releases and at its contacts 401—403 releases the check connector from the recorder. Relay 400 at its contacts 404—407 restores these contacts to their normally nonoperated condition.

Removal of ground from the marking leads of the thousands, hundreds and tens contact trees opens the operating circuits for relays 560, 635*b*, 620*a*, 650 and 660 which restore. The restoration of these relays opens all their respective contacts in preparation for the next call.

In summary, therefore, the check register and check connector are released from the recorder and restored to their non-operated conditions in preparation for another call. The check connector may then be seized by another check register which has registered the digits of another calling subscriber's directory number and through the sequence arrangement of relays 420 etc. is prepared to seize the now idle check connector. The sequence of operations previously described is repeated to complete the verification test for the calling subscriber and upon successful completion of the check by the check register, the call is extended to the called party and the release of the check register and check connector is then effectuated in the above described manner.

(5) NON-CHECK OPERATION

If the check tone loop circuit over the P-wire of the calling subscriber is open because the subscriber has dialed incorrectly, relay 500 re-operates since the oscillatory circuit 509 does not generate sufficient grid bias to reduce the plate current to a value below the operating value of relay 500. Relay 500 is re-energized and at its contacts 501 prevents ground from being applied to operate relay 130 and at its contacts 502 prepares a circuit for the operation of relay 135. Relay 500 at its contacts 504 prepares an operating circuit for the re-operation of relay 505 in response to the next dialing operation following the lockout of the present call. Relay 505 is rendered inoperative because of the open contact 514 of relay 510 which prevents the application of ground thereto. As a result, after an appropriate period determined by its slow release characteristics relay 505 releases and at its contacts 508 prevents further oscillation of oscillator 509. Relay 505 at its contacts 506 and 507 prepares the check connector for the receipt of the next call. However, during the interval between the removal of ground from the winding of relay 505 and its release, relay 135 of recorder 113 is operated over the following circuit: recorder battery, through the winding of relay 135, over contacts 144, conductor 150, contacts 401, conductor 431, contacts 502, 507, 515 and 561 to ground. Relay 135 at its lower contacts 137 locks itself to recorder ground. At its upper contacts 136, relay 135 removes ground from the winding of relay 140 which is then de-energized and at its contacts 141, 142, 143 and 144 releases the check register and check connector in the manner previously described.

Relay 560 restores and at its contacts 561 opens the holding circuit of relay 510 which releases. Upon the release of relays 410 and 510, the guard circuit is freed and the check connector is available for seizure by another call.

The operation of relay 135 of recorder 113 energizes a circuit (not shown) which places the calling line on lockout if the circuit is so equipped, or puts a busy signal upon the calling line so that the calling subscriber is aware of his incorrect dialing and will redial his own directory number.

An alarm circuit (ALM) is arranged to indicate a failure of tube 590 and operates by the application of ground over contacts 506, 501, and 512 to the alarm circuit.

(6) DIALING OF DIGIT 3

The dialing of digit 3 following the four digits of the calling subscriber's directory number is for the purpose of actuating a ringing circuit (not shown) and since it accomplishes no other function, it is absorbed in the recorder, not reaching the check register and connector circuits.

(7) COMPLETION OF CALL TO CALLED NUMBER

Following the dialing of the calling subscriber's directory number, the subscriber next dials the called number which in this case is assumed to be 32141. If the calling subscriber has correctly dialed his own directory number the called number is repeated by recorder 113 to the switching train comprising ticketing selector 114, trunk 120, trunk circuit 115, the trunk connecting the two Exchanges 81 and 82, trunk circuit 116, and automatic switching equipment in Exchange 82. Ringing of the called party whose directory number was assumed to be 32141 follows in the conventional manner. The digits of the exchange code, calling number, and called number are recorded on paper tape at the recorder stage in the form of a line of punches and interposed spaces which are provided by the tape punch mechanism 147 associated with recorder 113 in the manner discussed.

(8) OPERATION UPON ANSWERING OF CALLED PARTY

As previously explained when the called party answers, the recorder seizes the common calendar circuit 145 which, via the recorder, delivers information as to the date and time of day in the form of pulses to the tape punch mechanism 147 which in turn records this information on the paper tape in the form of a line of punches and interposed spaces. After this has been done, the recorder releases the calendar circuit. The time elapsed during the call is recorded on the paper tape by tape punch mechanism 147 in response to pulses applied thereto from clock circuit 146.

(9) RELEASE OF CALL

When the calling subscriber "A" hangs up his hand set upon the completion of his call, line circuit 101 releases line finder and selector link circuits 102 and 103 and the remaining trunks and acccessing equipment in both Exchanges 81 and 82 in the well known manner.

CONCLUSION

The novel automatic toll ticketing system of the present invention, therefore, comprises a plurality of registers, one of which stores the directory number of a calling subscriber who must first dial his own number. This register has access to a single common check connector on an "in line" basis with the remaining check registers. The check connector verifies the dialing of the calling subscriber by completing an oscillator feed back circuit over the P-wire of the subscriber's line circuit. If the subscriber has correctly dialed his own directory number, a relay in the recorder associated with the check register permits subsequent extension of the call to the called subscriber. If the check connector does not verify the dialing of the subscriber's number, his line circuit is put on lockout.

A punch mechanism having an associated calendar and clock circuit is operated in conjunction with the recorder to record the date and time of day as well as the elapsed time of the call upon a perforated tape. The punch mechanism also records the directory numbers of the calling and called subscribers and the called exchange.

A particular arrangement of groups of relays within the check connector permits the use of conventional 33 point relays while requiring a minimum of circuit complexity in its arrangement. In this regard a first group of relays selects 1000 out of 10,000 lines; a second group of relays selects a group of 100 out of the selected 1000 group of lines; a third group of relays is connected to select a group of 50 lines out of the 100 line group and a group of 5 lines out of the 50 line group; a fourth set of relays selects 1 digit out of the 5 lines selected by the relays of the third group.

The check register and check connector circuits are so arranged that upon the completion of the check operation they are immediately released and made available to accept and test subsequent calls, thus accelerating the rate at which calls are put through by the exchange equipment while yet reducing the amount of line test equipment necessary in each office.

These and other features of the invention which are believed to be new are set forth in the accompanying claims.

What is claimed is:

1. In an automatic telephone system, register means for registering the value of each digit of the calling party number, connector means, means in said connector for marking the value of the calling directory number therein, means for simultaneously transferring the complete number on said register means to said connector marking means, and direct selection means in said connector operative to directly select the subscriber line corresponding to the number transferred to said marking means.

2. In an automatic telephone system, at least one exchange which includes toll ticketing equipment, register means for registering the value of each digit of the calling party number, a single connector marking switch in said one exchange, means in said connector for marking the value of the calling directory number thereon, means in said register for seizing said connector and for simultaneously transferring the complete number on said register means to said connector marking means, and means in said connector operative to directly select the subscriber line corresponding to the number transferred to said marking means.

3. In a telephone system as set forth in claim 2 in which said exchange includes a plurality of register means, and guard means operative to connect said register senders to said single connector for use one at a time.

4. In an automatic telephone system having a plurality of exchanges, call extending means in each exchange for extending calls to other exchanges, toll ticketing equipment in at least one exchange of the type wherein the calling subscriber dials his own number for identification purposes, register means for registering the value of each digit of the calling party number as received, means for verifying the number as dialled by the calling party including connector means, means in said connector for marking the value of the calling directory number therein, means for simultaneously transferring the complete number on said register means to said connector marking means, means in said connector operative to directly select the subscriber line corresponding to the number transferred to said marking means, and verification means operative with selection of the subscriber line initiating the call as the result of the number marked on the connector to provide a verification signal to the call extending means of the associated exchange.

5. In a system as set forth in claim 4 in which said verification means includes means operative whenever said calling line selected is different than that of the calling party to block further extension of the call.

6. In an automatic telephone system, toll ticketing equipment of the type wherein the calling subscriber dials his own number for identification purposes, register means for registering the value of each digit of the calling party number as received, means for verifying the calling party number as dialled comprising connector means, means in the connector for marking the value of the calling directory number therein, means for transferring simultaneously the complete number stored on said register means to said connector marking means, means in said connector for directly selecting the subscriber line corresponding to the number transferred to said marking means, means for checking the line selected by said connector with the calling line, and means for restoring the register and connector means immediately subsequent to the completion of the check.

7. In an automatic telephone system including toll ticketing equipment, register means for registering the calling party number comprising a register set for storing each digit of the calling number, a series of marking conductors for each set connected to be marked by its associated register set responsive to storing of a digit therein, connector means, marking means in said connector for marking the value of the calling directory number thereon, means for simultaneously connecting the marking means for each set in said register means to said connector marking means, and means in said connector operative responsive thereto to directly select the subscriber line corresponding to the number transferred to said marking means.

8. A telephone system as set forth in claim 7 in which each register set comprises a series of four relays, a contact tree controlled by said relays singly and in combination to mark the marking conductors of the register, and a sequence control relay operative as a number is registered on its set to render a succeeding register set available.

9. A telephone system as set forth in claim 7 which includes a number of register sets which is one less in number than the digits to be registered and in which said register means includes a counting chain operative to establish the value of each incoming digit, means for marking the value of each incoming digit as established on a successive one of said register sets, and means for operating said counting chain as a register for the last digit.

10. In a selection arrangement, switching means for selectively seizing a member from a number of members which are divided into groups and subgroups, the members of each subgroup being divided into a plurality of sets, corresponding members of each set in a subgroup having corresponding designations, including means for selectively seizing the group which includes the desired member, means for selecting the subgroup including said desired member from the selected group, means operative to simultaneously select each of the members from each of the different sets of the subgroup having the same designation as the desired member, and means operative to select the desired member from the members thus selected.

11. In a selection arrangement, switching means for selectively seizing a member from a number of members which are divided into groups and subsgroups, each subgroup having a plurality of sets of said members, each of the members of the sets having a preassigned units designation, corresponding members of the sets of a subgroup having like units designations, including means for selecting the group which includes the desired member, means for selecting the subgroup including said member from the selected group, means operative to simultaneously select each of the members of the subgroup having the same units designation as the desired member, and member selecting means for selecting the desired member from the group of units members thus selected.

12. In a selection arrangement, switching means for selectively seizing a member from a number of members which are divided into groups and subgroups, the members of each subgroup being divided into a plurality of sets, corresponding members of each set having corresponding designations, including means for selecting the group which includes the desired member, means for selecting the subgroup including said member from the group selected, a multiple arrangement connected common to the subgroup selecting relays, means controlled by said subgroup relays to connect the subgroup selected thereto, means connected common to said multiple operative to simultaneously select each of the members of the subgroup sets having the same designation as the desired member, and member selecting means connected common to said multiple for selecting the desired member from the group last selected.

13. In a selector switch for selecting a desired line in an automatic telephone system comprising a number of lines divided into groups of one hundred lines each, each line having a preassigned units designator assigned thereto, means for selecting the one hundred line group which includes the desired line, means for selecting a subgroup of fifty lines including the desired line from the selected one hundred line group, means operative to simultaneously select the line from each of the five sets of ten line groups in the selected fifty line group, which have a units designator corresponding to that of the desired line, and means operative to select one line from the five lines thus selected.

14. A switching arrangement for selecting a desired line from a number of thousands of lines comprising a plurality of thousands relays, each of which is operative as seized to select the corresponding group of a thousand lines, a plurality of hundreds relays connected common to said thousands relays, each of which is operative as seized to select a corresponding group of one hundred lines from the selected thousand line group, means for connecting each hundred group of lines as two subgroups of fifty lines each, a plurality of subgroup relays associated with each hundreds line relay which are operative as seized to select an associated one of the fifty line groups, a plurality of units relays, each of which is operative as seized to simultaneously select the lines from the selected group of fifty lines which have the units designator corresponding to the units relay which is operated, and a plurality of tens marker relays, each of which is assigned a predetermined tens designator, operative as seized to select the line from the group of lines selected by said units relay which is in the tens groups assigned thereto.

15. In a switching arrangement, switching means for selecting a desired member from a number of members which are divided into a plurality of groups, each group being of a different denomination, certain groups being assigned different designators of higher denominations and other groups being assigned different designators of lower denominations, each group of the lowest denomination group of the higher denomination group being divided into subgroups, each subgroup being divided into a plurality of sets, including means for selecting successive groups of diminishing size toward and including the subgroup which includes the desired member, a multiple connected common to each member of the switching arrangement, means for connecting each member of the selected subgroup to the multiple, means operative to simultaneously select a member of each set of said subgroup including the desired member, and means operative thereafter to select the desired one of the members from the member thus selected.

16. In a switching arrangement, switching means for selecting a desired member from a number of members which are divided into a plurality of groups, each group being of a different denomination, certain groups being assigned different designators of the higher denominations and other groups being assigned different designators of the lower denominations, the lowest denomination group of the higher denomination group being divided into subgroups, each subgroup being divided into a plurality of sets, including means for selecting a group of said members of the highest denomination including the desired member, and thereafter selecting successive groups of diminishing size toward the smallest group of the higher denominations which includes the desired member, a multiple connected common to the members of the switching arrangement, means for selecting the subgroup of the selected group which includes the desired member and connecting same to said multiple, means operative to simultaneously select a member from each set of said subgroup including the desired member, and means associated with the groups of the lower denomination operative to select the desired one of the members from the members thus selected.

17. In a selector switch arrangement operative responsive to receipt of a number-representing set of signals to select the one of a plurality of lines which is represented thereby; a plurality of hundreds relays, each of which is assigned to a corresponding one hundred line group in the arrangement; means operative responsive to receipt of the hundreds digit of a number to effect operation of the corresponding hundreds relay in the selection of its associated one hundred line group; a set of subgroup relays for each one hundred line group, each of which has a predetermined number of lines of the one hundred line group associated therewith; a set of tens marker relays operative with receipt of the tens digit of the number to mark the tens group of the desired line, and to operate the subgroup relay which has access to the subgroup which includes the desired line; a set of units relays, each of which is operative with receipt of its assigned units digit to simultaneously select each of the lines from the selected subgroup which have the corresponding units designation, and means controlled by said tens marker relays to effect seizure of the desired one of the lines from the lines selected by the operated units relay.

18. An arrangement as set forth in claim 17 which includes five tens marker relays, each of which has an upper and lower operating winding; means for connecting each winding to indicate, as energized, a different tens group; the upper windings being connected to indicate the tens group 1—5, and the lower windings being connected to indicate the tens group 6—0; and in which the subgroup relays for each one hundred lines comprises two pairs of relays, one pair being connected for operation in series with the upper windings of the tens marker relays, and the other of the pairs being connected for operation in series with the lower windings of said tens marker relays.

19. In a selector switch arrangement operative responsive to receipt of a number representing a set of signals to select the one of a plurality of lines which is represented thereby; a multiple, a plurality of hundreds relays, each of which is assigned to a corresponding one hundred line group in the arrangement; means operative responsive to receipt of the hundreds digit of a number to effect operation of the corresponding hundreds relays in the selection of its associated one hundred line group, a set of subgroup relays for each one hundred line group, each of which has a predetermined number of lines of the one hundred line group associated therewith; a set of tens marker relays common to said multiple operative with receipt of the tens digit of the number to mark the tens group of the desired line, and to operate the subgroup relay which has access to the subgroup which includes the desired line, means controlled by each subgroup relay as operated to connect its associated group of lines to the multiple, a set of units relays common to said multiple, each of which is operative responsive to receipt of its assigned units digit to simultaneously select each of the lines from the multiple which have the corresponding units designation, and means controlled by said tens marker relays to effect seizure of the desired one of the lines from the lines selected by the operated one of the units relays.

20. In a connector switch for use in an automatic telephone exchange having access to a number of thousands of subscriber lines, marking means connected to accept simultaneously the signals representative of a complete subscriber directory number, and means for selecting the subscriber line indicated thereby comprising a set of thousands relays operative as seized to select the thousands group including the desired line, a set of hundreds relays connected common to said thousands relays, each of which is operative, as seized, to select from the selected thousands group the hundreds group including the desired line; a set of subgroup relays for each hundred line group, a set of tens marker relays operative with receipt of the tens digit to mark the tens group of the desired line and to effect operation of the subgroup relay having access to the subgroup which includes the desired line; a set of units relays operative responsive to receipt of the units digit to simultaneously select each of the lines from the selected subgroup which have the same designation as that of the units marking signal, and means controlled by the operated one of the tens marker relays to seize the desired one of the lines from the lines selected by the units relay.

References Cited in the file of this patent

UNITED STATES PATENTS

| | | |
|---|---|---|
| 2,508,636 | Baker | May 23, 1950 |
| 2,535,512 | Ostline | Dec. 26, 1950 |
| 2,562,594 | Bielenberg | July 31, 1951 |
| 2,621,256 | Stehli | Dec. 9, 1952 |